United States Patent
Itagaki (10) Patent No.: US 11,371,451 B2
(45) Date of Patent: Jun. 28, 2022

(54) INDICATOR CONTROL SYSTEM AND VEHICLE

(71) Applicant: TOYOTA JIDOSHA KABUSHIKI KAISHA, Toyota (JP)

(72) Inventor: Kenji Itagaki, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 16/864,367

(22) Filed: May 1, 2020

(65) Prior Publication Data

US 2020/0362782 A1 Nov. 19, 2020

(30) Foreign Application Priority Data

May 14, 2019 (JP) .............................. JP2019-091521

(51) Int. Cl.
   *F02D 41/02* (2006.01)
   *B60K 6/24* (2007.10)
   *B60K 6/26* (2007.10)
   *B60K 6/365* (2007.10)

(52) U.S. Cl.
   CPC .............. *F02D 41/021* (2013.01); *B60K 6/24* (2013.01); *B60K 6/26* (2013.01); *B60K 6/365* (2013.01); *B60Y 2200/92* (2013.01); *F02D 2200/101* (2013.01); *F02D 2200/602* (2013.01)

(58) Field of Classification Search
   CPC ......... F02D 41/021; F02D 41/22; B60K 6/24; B60K 6/26; B60K 6/365; B60K 6/445; B60K 35/00; B60K 37/02; B60Y 2200/92; B60Y 2200/101; B60Y 2200/602; B60W 10/101; B60W 2510/0633; B60W 2510/0638; B60W 2540/10; B60W 2710/0638; B60W 2710/0644; B60W 2710/0666; B60W 2710/083

See application file for complete search history.

(56) References Cited

U.S. PATENT DOCUMENTS 7,091,839 B2 8/2006 Situ et al.
2014/0229076 A1 8/2014 Doering et al.
(Continued)

FOREIGN PATENT DOCUMENTS

CN 108025642 A * 5/2018 ............. B60K 35/00
EP 2061686 B1 10/2016
(Continued)

*Primary Examiner* — George C Jin
(74) *Attorney, Agent, or Firm* — Oliff PLC (57) ABSTRACT

An indicator control system includes an indicator configured to show a rotational speed of an internal combustion engine, and a controller configured to control an indicated rotational speed, which is the rotational speed to be shown by the indicator. The controller is configured such that, during a specific period in which the rotational speed of the internal combustion engine is reduced from a first rotational speed to a rotational speed lower than the first rotational speed and then increased to a second rotational speed higher than the first rotational speed, the controller increases the indicated rotational speed to the second rotational speed without reducing the indicated rotational speed from the first rotational speed to the rotational speed lower than the first rotational speed.

9 Claims, 9 Drawing Sheets

(56) References Cited

U.S. PATENT DOCUMENTS

| | | | | |
|---|---|---|---|---|
| 2015/0127232 A1* | 5/2015 | Hamamura | ............ | F02D 41/021 |
| | | | | 701/84 |
| 2015/0175004 A1* | 6/2015 | Yasunaga | ............... | B60K 37/06 |
| | | | | 340/441 |
| 2018/0297465 A1* | 10/2018 | Miyaishi | ................. | F16H 61/36 |
| 2021/0301502 A1* | 9/2021 | Udagawa | ................ | F02D 41/22 |

FOREIGN PATENT DOCUMENTS

| | | | | |
|---|---|---|---|---|
| JP | 2010-254120 A | | 11/2010 | |
| JP | 2016-215677 A | | 12/2016 | |
| KR | 20200131743 A | * | 11/2020 | ............ B60K 35/00 |

\* cited by examiner

INDICATOR CONTROL SYSTEM AND VEHICLE

INCORPORATION BY REFERENCE

The disclosure of Japanese Patent Application No. 2019-091521 filed on May 14, 2019 including the specification, drawings and abstract is incorporated herein by reference in its entirety.

BACKGROUND

1. Technical Field

The present disclosure relates to control on an indicator configured to show a rotational speed of an internal combustion engine.

2. Description of Related Art

Japanese Unexamined Patent Application Publication No. 2016-215677 (JP 2016-215677 A) discloses a hybrid vehicle including an internal combustion engine, a rotating electrical machine, and a planetary gear mechanism provided between the internal combustion engine, the rotating electrical machine, and each driving wheel. In the hybrid vehicle, an operating point (defined by a rotational speed and a torque) of the internal combustion engine is changed depending on vehicle conditions.

SUMMARY

Vehicles with internal combustion engines generally have indicators (so-called tachometers) each configured to show the rotational speed of the internal combustion engine. When the operating point of the internal combustion engine is changed depending on vehicle conditions as in the hybrid vehicle disclosed in JP 2016-215677 A, the rotational speed of the internal combustion engine may decrease even though, for example, an occupant (user) of the vehicle is requesting acceleration by depressing an accelerator pedal. If the indicator shows the rotational speed of the internal combustion engine as it is in that situation, the rotational speed intended by the user differs from the rotational speed shown by the indicator. Therefore, the occupant may feel discomfort.

The present disclosure has been made to reduce the user's discomfort by reducing the difference between the rotational speed intended by the user and the rotational speed shown by the indicator when the indicator shows the rotational speed of the internal combustion engine.

A first aspect of the present disclosure relates to an indicator control system. The indicator control system includes an indicator and a controller. The indicator is configured to show a rotational speed of an internal combustion engine. The controller is configured to control an indicated rotational speed, which is the rotational speed to be shown by the indicator. The controller is configured such that, during a specific period in which the rotational speed of the internal combustion engine is reduced from a first rotational speed to a rotational speed lower than the first rotational speed and then increased to a second rotational speed higher than the first rotational speed, the controller increases the indicated rotational speed to the second rotational speed without reducing the indicated rotational speed from the first rotational speed to the rotational speed lower than the first rotational speed.

According to the configuration described above, during the specific period in which the rotational speed of the internal combustion engine is reduced from the first rotational speed to the rotational speed lower than the first rotational speed and then increased to the second rotational speed higher than the first rotational speed, the indicated rotational speed to be shown by the indicator is increased to the second rotational speed without being reduced from the first rotational speed to the rotational speed lower than the first rotational speed. Therefore, when the specific period is started in response to, for example, a user's acceleration request, a decrease in the indicated rotational speed is suppressed during the specific period. Thus, a difference between a rotational speed intended by the user and the indicated rotational speed is reduced. As a result, user's discomfort can be reduced.

In the indicator control system, the controller may be configured to keep the indicated rotational speed at the first rotational speed and then increase the indicated rotational speed to the second rotational speed in the specific period.

In the indicator control system, the controller may be configured to increase the indicated rotational speed from the first rotational speed at a predetermined increase rate in the specific period.

A second aspect of the present disclosure relates to a vehicle. The vehicle includes an indicator, a driving wheel, a continuously variable transmission, and a controller. The indicator is configured to show a rotational speed of an internal combustion engine. The continuously variable transmission is provided between the internal combustion engine and the driving wheel. The controller is configured to control an indicated rotational speed, which is the rotational speed to be shown by the indicator. The controller is configured such that, during a specific period in which the rotational speed of the internal combustion engine is reduced from a first rotational speed to a rotational speed lower than the first rotational speed and then increased to a second rotational speed higher than the first rotational speed, the controller increases the indicated rotational speed to the second rotational speed without reducing the indicated rotational speed from the first rotational speed to the rotational speed lower than the first rotational speed.

The vehicle may further include a rotating electrical machine. The continuously variable transmission may be a planetary gear mechanism provided between the internal combustion engine, the rotating electrical machine, and the driving wheel.

In the vehicle, the internal combustion engine may include a turbocharger.

In the vehicle, the specific period may be started when the turbocharger is actuated. The first rotational speed may be a rotational speed of the internal combustion engine at a start of the actuation of the turbocharger. The controller may be configured such that, when the rotational speed of the internal combustion engine is lower than the first rotational speed in the specific period, the controller sets the indicated rotational speed equal to or higher than the first rotational speed.

In the vehicle, the specific period may be started when an accelerator operation amount is increased. The first rotational speed may be a rotational speed of the internal combustion engine at a start of the increase in the accelerator operation amount. The controller may be configured such that, when the rotational speed of the internal combustion engine is lower than the first rotational speed in the specific period, the controller sets the indicated rotational speed equal to or higher than the first rotational speed.

In the vehicle, the controller may be configured such that, after the rotational speed of the internal combustion engine reaches the indicated rotational speed along with acceleration of the vehicle in the specific period, the controller sets the indicated rotational speed to the rotational speed of the internal combustion engine.

According to the present disclosure, the user's discomfort can be reduced by reducing the difference between the rotational speed intended by the user and the rotational speed shown by the indicator.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure is described below in detail with reference to the drawings. In the drawings, the same or corresponding parts are represented by the same reference symbols to omit redundant description.

Figure 1:
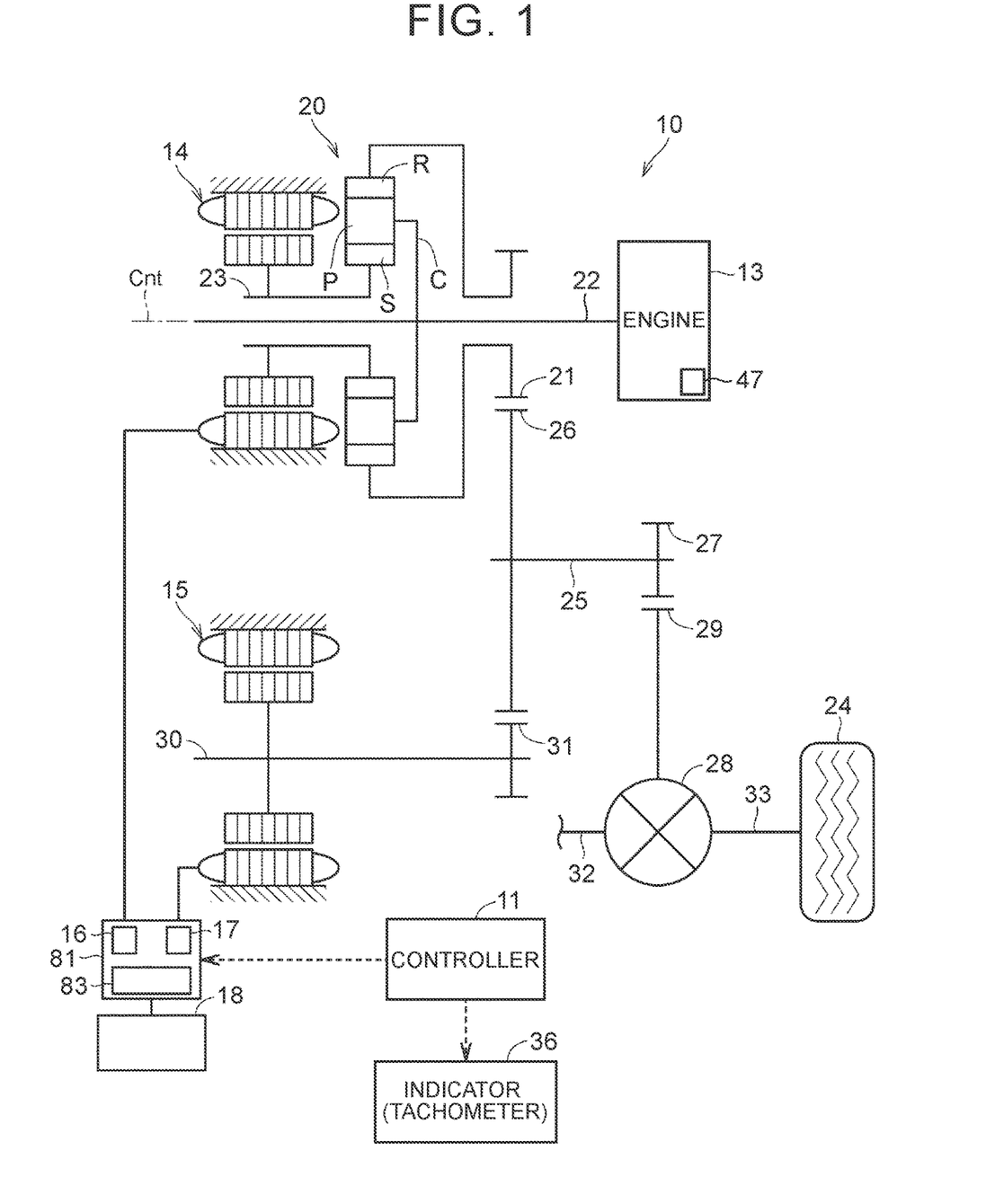
FIG. 1 is a diagram illustrating an example of the structure of a drive system for a vehicle.

FIG. 1 is a diagram illustrating an example of the structure of a drive system for a vehicle 10 including an indicator control system according to this embodiment. The vehicle 10 is a hybrid vehicle including an engine (internal combustion engine) 13 and a second motor generator (hereinafter referred to also as "second MG") 15 as driving power sources. The vehicle 10 further includes a controller 11 and a first motor generator (rotating electrical machine; hereinafter referred to also as "first MG") 14.

The engine 13 includes a turbocharger 47. Each of the first MG 14 and the second MG 15 functions as a motor and a generator. The motor outputs a torque by being supplied with driving electric power. The generator generates electric power by being supplied with a torque. An alternating current (AC) rotating electrical machine is used as each of the first MG 14 and the second MG 15. Examples of the AC rotating electrical machine include a permanent-magnet synchronous motor including a rotor with embedded permanent magnets.

Each of the first MG 14 and the second MG 15 is electrically connected to a battery 18 via a power control unit (PCU) 81. The PCU 81 includes a first inverter 16, a second inverter 17, and a converter 83.

For example, the converter 83 is configured to supply electric power of the battery 18 to the first inverter 16 or the second inverter 17 by stepping up a voltage of the electric power. Alternatively, the converter 83 is configured to supply electric power from the first inverter 16 or the second inverter 17 to the battery 18 by stepping down a voltage of the electric power.

The first inverter 16 is configured to convert direct current (DC) power from the converter 83 into AC power and supply the AC power to the first MG 14. Alternatively, the first inverter 16 is configured to convert AC power from the first MG 14 into DC power and supply the DC power to the converter 83.

The second inverter 17 is configured to convert the DC power from the converter 83 into AC power and supply the AC power to the second MG 15. Alternatively, the second inverter 17 is configured to convert AC power from the second MG 15 into DC power and supply the DC power to the converter 83.

That is, the PCU 81 charges the battery 18 by using electric power generated by the first MG 14 or the second MG 15, and drives the first MG 14 or the second MG 15 by using electric power of the battery 18.

Examples of the battery 18 include a lithium ion secondary battery or a nickel-metal hydride secondary battery. The lithium ion secondary battery contains lithium as a charge carrier, and may include a general lithium ion secondary battery using a liquid electrolyte, and a so-called solid-state battery using a solid electrolyte. The battery 18 is at least a rechargeable battery. For example, an electric double layer capacitor may be used in place of the secondary battery.

The engine 13 and the first MG 14 are coupled to a planetary gear mechanism 20. The planetary gear mechanism 20 splits a driving torque output from the engine 13, and transmits the driving torque to the first MG 14 and an output gear 21. The planetary gear mechanism 20 is a single-pinion planetary gear mechanism, and is arranged on an axis Cnt shared with an output shaft 22 of the engine 13.

The planetary gear mechanism 20 includes a sun gear S, a ring gear R, pinion gears P, and a carrier C. The ring gear R is arranged coaxially with the sun gear S. The pinion gears P mesh with the sun gear S and the ring gear R. The carrier C retains the pinion gears P so that each pinion gear P is rotatable about its axis and about the sun gear S. The output shaft 22 is coupled to the carrier C. A rotor shaft 23 of the first MG 14 is coupled to the sun gear S. The ring gear R is coupled to the output gear 21. The output gear 21 is an example of an outputter configured to transmit the driving torque to driving wheels 24.

In the planetary gear mechanism 20, the carrier C to which the driving torque is transmitted from the engine 13 serves as an input element, the ring gear R that outputs the driving torque to the output gear 21 serves as an output element, and the sun gear S coupled to the rotor shaft 23 serves as a reaction element. That is, the planetary gear mechanism 20 splits the power output from the engine 13 toward the first MG 14 and the output gear 21.

With the structure of the planetary gear mechanism 20 described above, a rotational speed of the sun gear S (that is, a rotational speed of the first MG 14), a rotational speed of the carrier C (that is, a rotational speed of the engine 13), and a rotational speed of the ring gear R (that is, a rotational speed of the second MG 15) have a relationship in which, when any two rotational speeds are determined, the remaining rotational speed is determined as well.

The first MG 14 is controlled to output a torque depending on the rotational speed of the engine 13. By appropriately adjusting the rotational speed of the first MG 14 coupled to the sun gear S, the planetary gear mechanism 20 functions as an electric continuously variable transmission configured to steplessly change the ratio between a rotational speed of each driving wheel 24 (that is, a vehicle speed) coupled to the ring gear R and the rotational speed of the engine 13 coupled to the carrier C.

A countershaft 25 is arranged in parallel to the axis Cnt. The countershaft 25 is attached to a driven gear 26 meshing with the output gear 21. A driving gear 27 is attached to the countershaft 25. The driving gear 27 meshes with a ring gear 29 of a differential gear 28 serving as a final speed reducer. A driving gear 31 meshes with the driven gear 26. The driving gear 31 is attached to a rotor shaft 30 of the second MG 15. Thus, a driving torque output from the second MG 15 is added to the driving torque output from the output gear 21 at the driven gear 26. The resultant driving torque is transmitted to the driving wheels 24 via drive shafts 32 and 33 extending in a lateral direction from the differential gear 28. By transmitting the driving torque to the driving wheels 24, a driving force is generated in the vehicle 10.

The vehicle 10 further includes an indicator 36. The indicator 36 is a so-called tachometer. That is, the indicator 36 shows the rotational speed of the engine 13 to a user (occupant) of the vehicle 10 in response to a command signal from the controller 11.

Figure 2:
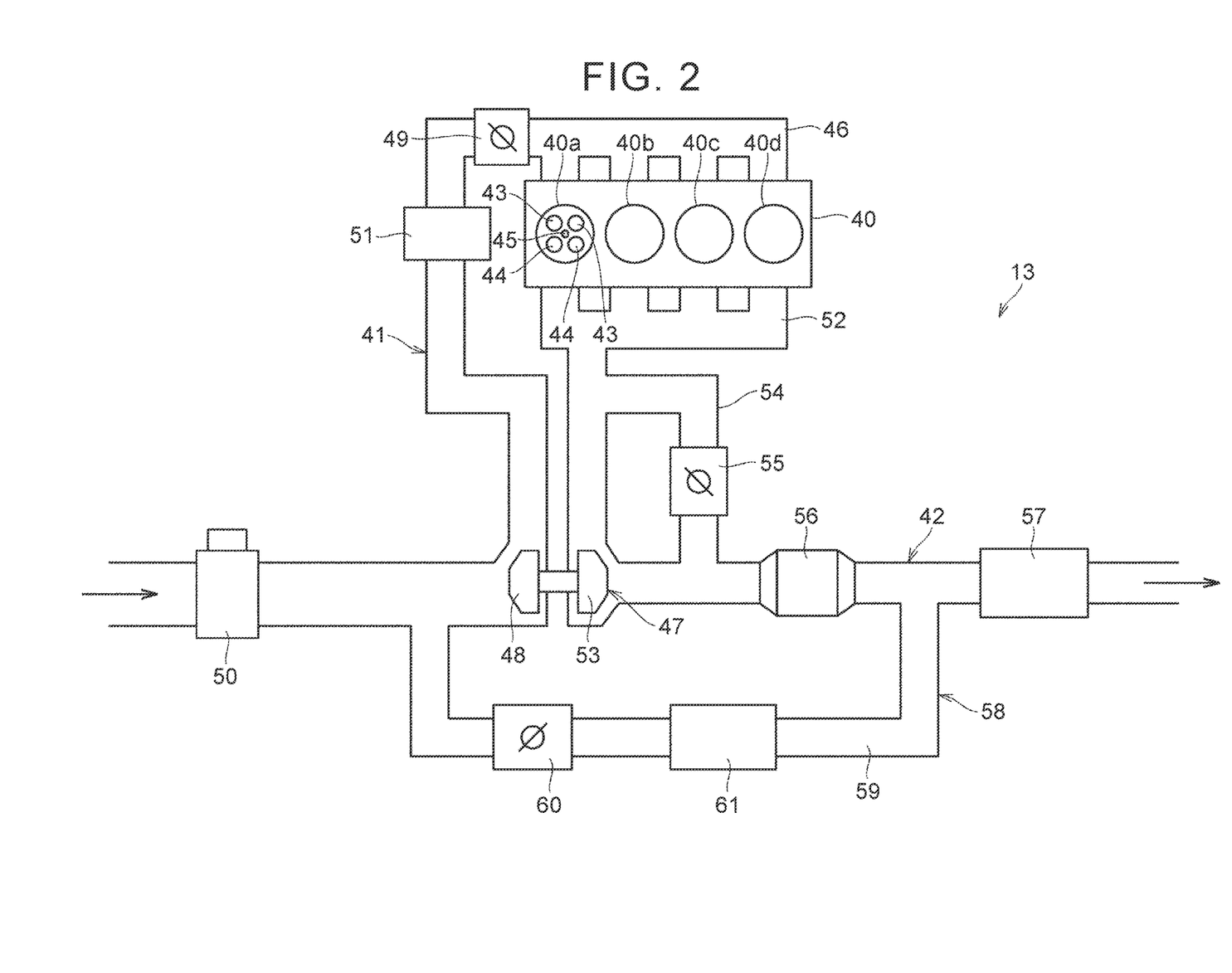
FIG. 2 is a diagram illustrating an example of the structure of an engine with a turbocharger.

FIG. 2 is a diagram illustrating an example of the structure of the engine 13 with the turbocharger 47. For example, the engine 13 is an in-line four-cylinder spark-ignition internal combustion engine. As illustrated in FIG. 2, the engine 13 includes, for example, an engine body 40 including four cylinders 40*a*, 40*b*, 40*c*, and 40*d* arrayed in one direction.

First ends of intake and exhaust ports formed in the engine body 40 are connected to the cylinders 40*a*, 40*b*, 40*c*, and 40*d*, respectively. The first end of each intake port is opened or closed by two intake valves 43 provided in each of the cylinders 40*a*, 40*b*, 40*c*, and 40*d*. The first end of each exhaust port is opened or closed by two exhaust valves 44 provided in each of the cylinders 40*a*, 40*b*, 40*c*, and 40*d*. Second ends of the intake ports of the cylinders 40*a*, 40*b*, 40*c*, and 40*d* are connected to an intake manifold 46. Second ends of the exhaust ports of the cylinders 40*a*, 40*b*, 40*c*, and 40*d* are connected to an exhaust manifold 52.

In this embodiment, the engine 13 is, for example, a direct-injection engine, and fuel is injected into each of the cylinders 40*a*, 40*b*, 40*c*, and 40*d* by a fuel injector (not illustrated) provided at the top of the cylinder. In each of the cylinders 40*a*, 40*b*, 40*c*, and 40*d*, an air-fuel mixture containing the fuel and intake air is ignited by a spark plug 45 provided in each of the cylinders 40*a*, 40*b*, 40*c*, and 40*d*.

FIG. 2 illustrates the intake valves 43, the exhaust valves 44, and the spark plug 45 provided in the cylinder 40*a*, and illustration is omitted for the intake valves 43, the exhaust valves 44, and the spark plugs 45 provided in the other cylinders 40*b*, 40*c*, and 40*d*.

The engine 13 is provided with the turbocharger 47 configured to turbocharge intake air by using exhaust energy. The turbocharger 47 includes a compressor 48 and a turbine 53.

A first end of an intake passage 41 is connected to the intake manifold 46. A second end of the intake passage 41 is connected to an air inlet. The compressor 48 is provided at a predetermined position in the intake passage 41. An airflow meter 50 is provided between the second end of the intake passage 41 (air inlet) and the compressor 48. The airflow meter 50 outputs a signal depending on a flow rate of air in the intake passage 41. An intercooler 51 is provided on a downstream side of the compressor 48 in the intake passage 41. The intercooler 51 cools intake air pressurized by the compressor 48. A throttle valve 49 is provided between the intercooler 51 and the first end of the intake passage 41. The throttle valve 49 can adjust a flow rate of intake air in the intake passage 41.

A first end of an exhaust passage 42 is connected to the exhaust manifold 52. A second end of the exhaust passage 42 is connected to a muffler (not illustrated). The turbine 53 is provided at a predetermined position in the exhaust passage 42. An exhaust gas bypass passage 54 and a wastegate valve 55 are provided in the exhaust passage 42. The exhaust gas bypass passage 54 bypasses exhaust gas on an upstream side of the turbine 53 to a downstream side of the turbine 53. The wastegate valve 55 is provided in the bypass passage to adjust a flow rate of exhaust gas to be guided to the turbine 53. By controlling the opening degree of the wastegate valve 55, the flow rate of the exhaust gas flowing into the turbine 53, that is, a turbocharging pressure of the intake air is adjusted. The exhaust gas flowing through the turbine 53 or the wastegate valve 55 is released into the atmosphere after being controlled by a start-up converter 56 and a post-processing device 57 provided at predetermined positions in the exhaust passage 42. For example, the post-processing device 57 includes a three-way catalyst.

The engine 13 is provided with an exhaust gas recirculation (EGR) system 58 configured to cause exhaust gas to flow into the intake passage 41. The EGR system 58 includes an EGR passage 59, an EGR valve 60, and an EGR cooler 61. The EGR passage 59 extracts a part of the exhaust gas from the exhaust passage 42 as EGR gas, and guides the EGR gas to the intake passage 41. The EGR valve 60 adjusts a flow rate of the EGR gas in the EGR passage 59. The EGR cooler 61 cools the EGR gas flowing through the EGR passage 59. The EGR passage 59 connects a part of the exhaust passage 42 between the start-up converter 56 and the post-processing device 57 and a part of the intake passage 41 between the compressor 48 and the airflow meter 50.

Figure 3:
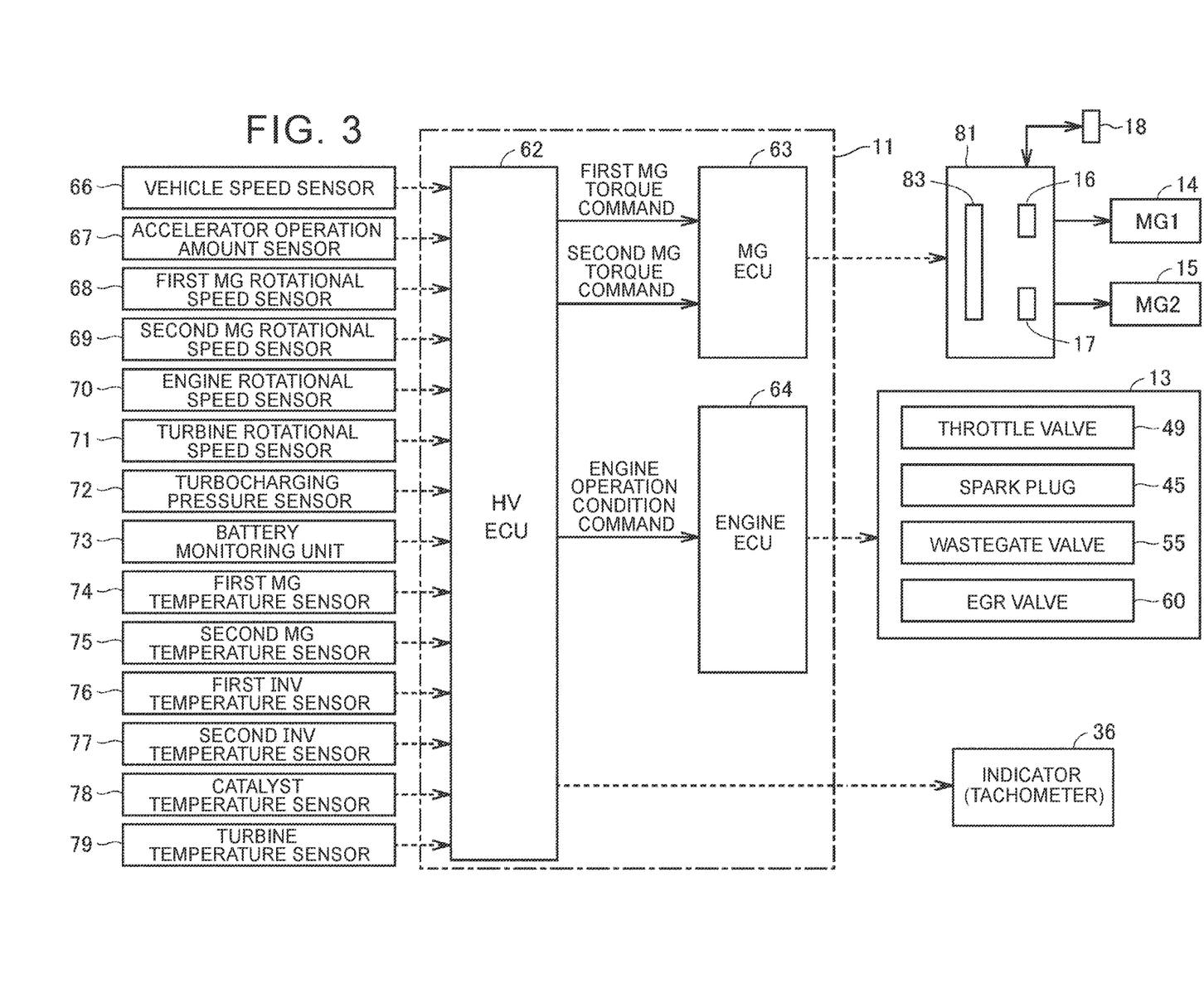
FIG. 3 is a block diagram illustrating an example of the configuration of a controller.

FIG. 3 is a block diagram illustrating an example of the configuration of the controller 11. As illustrated in FIG. 3, the controller 11 includes a hybrid vehicle (HV)-electronic control unit (ECU) 62, an MG-ECU 63, and an engine ECU 64.

The HV-ECU 62 is a controller configured to cooperatively control the engine 13, the first MG 14, and the second MG 15. The MG-ECU 63 is a controller configured to control operations of the PCU 81. The engine ECU 64 is a controller configured to control operations of the engine 13.

Each of the HV-ECU 62, the MG-ECU 63, and the engine ECU 64 includes an input/output device, a memory, a central processing unit (CPU), and a counter. The input/output device exchanges signals with various sensors and the other ECUs connected to the input/output device. The memory stores various control programs and maps. The CPU executes the control programs. The counter measures time.

A vehicle speed sensor 66, an accelerator operation amount sensor 67, a first MG rotational speed sensor 68, a second MG rotational speed sensor 69, an engine rotational speed sensor 70, a turbine rotational speed sensor 71, a turbocharging pressure sensor 72, a battery monitoring unit 73, a first MG temperature sensor 74, a second MG temperature sensor 75, a first inverter (INV) temperature sensor 76, a second INV temperature sensor 77, a catalyst temperature sensor 78, and a turbine temperature sensor 79 are connected to the HV-ECU 62.

The vehicle speed sensor 66 detects the speed of the vehicle 10 (vehicle speed). The accelerator operation amount sensor 67 detects an amount of depression of an accelerator pedal by the user (accelerator operation amount). The first MG rotational speed sensor 68 detects the rotational speed of the first MG 14. The second MG rotational speed sensor 69 detects the rotational speed of the second MG 15. The engine rotational speed sensor 70 detects the rotational speed of the engine 13 (hereinafter referred to also as "engine rotational speed Ne"). The turbine rotational speed sensor 71 detects a rotational speed of the turbine 53 of the turbocharger 47. The turbocharging pressure sensor 72 detects the turbocharging pressure of the engine 13. The first MG temperature sensor 74 detects an internal temperature of the first MG 14, such as a temperature related to coils and magnets. The second MG temperature sensor 75 detects an internal temperature of the second MG 15, such as a temperature related to coils and magnets. The first INV temperature sensor 76 detects a temperature of the first inverter 16, such as a temperature related to switching elements. The second INV temperature sensor 77 detects a temperature of the second inverter 17, such as a temperature related to switching elements. The catalyst temperature sensor 78 detects a temperature of the post-processing device 57. The turbine temperature sensor 79 detects a temperature of the turbine 53. The various sensors output signals indicating detection results to the HV-ECU 62.

The battery monitoring unit 73 acquires a state of charge (SOC), and outputs a signal indicating the acquired SOC to the HV-ECU 62. The SOC is the ratio of the remaining charge amount to the full charge capacity of the battery 18.

For example, the battery monitoring unit 73 includes sensors configured to detect a current, voltage, and temperature of the battery 18. The battery monitoring unit 73 acquires the SOC by calculating the SOC based on the detected current, voltage, and temperature of the battery 18.

Examples of the SOC calculation method include a method involving current value integration (Coulomb counting), a method involving estimation of an open circuit voltage (OCV), and various other known methods.

The HV-ECU 62 controls an engine rotational speed to be shown by the indicator 36 (hereinafter referred to also as "indicated engine rotational speed Ned") based on the actual engine rotational speed Ne detected by the engine rotational speed sensor 70. Specifically, the HV-ECU 62 calculates, as a "corrected engine rotational speed Nes", a value obtained by correcting the actual engine rotational speed Ne by smoothing (first-order lag filtering or weighted averaging) in order that the indicated engine rotational speed Ned may change more smoothly than the actual engine rotational speed Ne, and controls the indicated engine rotational speed Ned based on the corrected engine rotational speed Nes. The control is not limited to the control on the indicated engine rotational speed Ned using the corrected engine rotational speed Nes. The indicated engine rotational speed Ned may be controlled by using the actual engine rotational speed Ne.

FIG. 3 illustrates the example in which the HV-ECU 62 controls the indicator 36, but for example, the engine ECU 64 may control the indicator 36. In the following description, the "controller 11" controls the indicator 36 without distinguishing the HV-ECU 62 and the engine ECU 64.

The vehicle 10 having the configuration described above can set or switch its driving mode to, for example, a hybrid (HV) driving mode or an electric (EV) driving mode. In the HV driving mode, the engine 13 and the second MG 15 are used as power sources. In the EV driving mode, the engine 13 is stopped and the second MG 15 is driven by electric power stored in the battery 18 to drive the vehicle 10. The HV-ECU 62 sets or switches the modes. The HV-ECU 62 controls the engine 13, the first MG 14, and the second MG 15 based on the set or switched driving mode.

For example, the EV driving mode is selected in a low-load operation range in which the vehicle speed is low and the requested driving force is small. In the EV driving mode, the operation of the engine 13 is stopped, and the second MG 15 outputs a driving force.

The HV driving mode is selected in a high-load operation range in which the vehicle speed is high and the requested driving force is great. In the HV driving mode, a torque obtained by combining the driving torque of the engine 13 and the driving torque of the second MG 15 is output.

In the HV driving mode, the first MG 14 applies a reaction force to the planetary gear mechanism 20 when the driving torque output from the engine 13 is transmitted to the driving wheels 24. Therefore, the sun gear S functions as the reaction element. That is, the first MG 14 is controlled to output a reaction torque to the engine torque so that the engine torque is applied to the driving wheels 24. In this case, regenerative control can be executed to cause the first MG 14 to function as the generator.

Description is given of the cooperative control on the engine 13, the first MG 14, and the second MG 15 during the operation of the vehicle 10.

The HV-ECU 62 calculates a requested driving torque based on, for example, the accelerator operation amount determined depending on the amount of depression of the accelerator pedal. The HV-ECU 62 calculates requested driving power of the vehicle 10 based on, for example, the calculated requested driving torque and the vehicle speed. The HV-ECU 62 calculates, as requested system power, a value obtained by adding requested charging/discharging power of the battery 18 to the requested driving power. For example, the requested charging/discharging power of the battery 18 is set based on the SOC of the battery 18.

The HV-ECU 62 determines whether the operation of the engine 13 is requested based on the calculated requested system power. For example, when the requested system power is greater than a threshold, the HV-ECU 62 determines that the operation of the engine 13 is requested. When the operation of the engine 13 is requested, the HV-ECU 62 sets the HV driving mode as the driving mode. When the operation of the engine 13 is not requested, the HV-ECU 62 sets the EV driving mode as the driving mode.

When the operation of the engine 13 is requested (that is, the HV driving mode is set), the HV-ECU 62 calculates requested power of the engine 13 (hereinafter referred to as "requested engine power"). For example, the HV-ECU 62 calculates the requested system power as the requested engine power. The HV-ECU 62 outputs the calculated requested engine power to the engine ECU 64 as an engine operation condition command.

The engine ECU 64 variously controls the respective portions of the engine 13, such as the throttle valve 49, the spark plugs 45, the wastegate valve 55, and the EGR valve 60, based on the engine operation condition command input from the HV-ECU 62.

The HV-ECU 62 sets an operating point of the engine 13 by using the calculated requested engine power in a coordinate system defined by the engine rotational speed Ne and the engine torque. For example, the HV-ECU 62 sets, as the operating point of the engine 13, an intersection of a predetermined operation curve and an iso-power curve in the coordinate system. The iso-power curve represents output power equal to the requested engine power. The predetermined operation curve represents a locus of a change in the engine torque relative to a change in the engine rotational speed Ne in the coordinate system.

The HV-ECU 62 sets an engine rotational speed Ne corresponding to the set operating point of the engine 13 as a target engine rotational speed Netag.

When the target engine rotational speed Netag is set, the HV-ECU 62 sets a torque command value for the first MG 14 so that the current engine rotational speed Ne is equal to the target engine rotational speed Netag. For example, the HV-ECU 62 sets the torque command value for the first MG 14 through feedback control based on a difference between the current engine rotational speed Ne and the target engine rotational speed Netag.

The HV-ECU 62 calculates the amount of transmission of the engine torque to the driving wheels 24 based on the set torque command value for the first MG 14, and sets a torque command value for the second MG 15 so that the requested driving force is satisfied. The HV-ECU 62 outputs the set torque command values for the first MG 14 and the second MG 15 to the MG-ECU 63 as a first MG torque command and a second MG torque command, respectively.

The MG-ECU 63 calculates current values and their frequencies corresponding to the torques to be generated in the first MG 14 and the second MG 15 based on the first MG torque command and the second MG torque command input from the HV-ECU 62, and outputs a signal containing the calculated current values and frequencies to the PCU 81.

The HV-ECU 62 adjusts the opening degree of the wastegate valve 55 based on the operating point of the engine 13, thereby adjusting the flow rate of exhaust gas into the turbine 53 of the turbocharger 47, that is, the turbocharging pressure of intake air through the compressor 48.

As described above, each of the HV-ECU 62, the MG-ECU 63, and the engine ECU 64 includes the CPU and the memory (not illustrated). FIG. 3 illustrates the exemplary configuration in which the HV-ECU 62, the MG-ECU 63, and the engine ECU 64 are separated, but those ECUs may be provided as a single integrated ECU.

Figure 4:
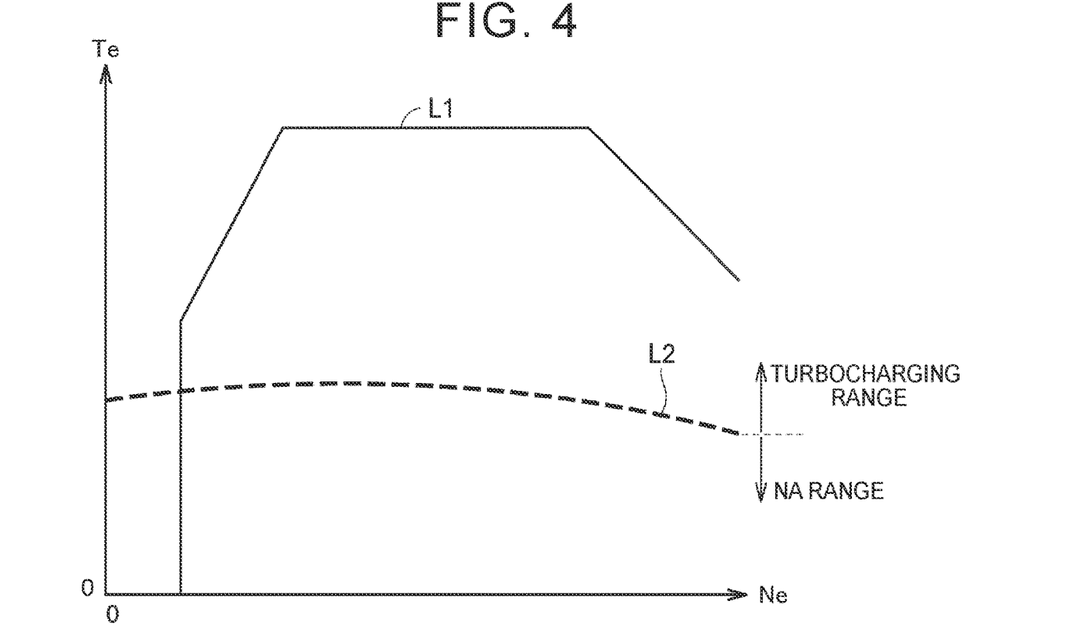
FIG. 4 is a diagram for describing an operating point of the engine.

FIG. 4 is a diagram for describing the operating point of the engine 13. In FIG. 4, a vertical axis represents an engine torque Te (torque of the engine 13), and a horizontal axis represents the engine rotational speed Ne. In FIG. 4, the operating point of the engine 13 is determined by the engine torque Te and the engine rotational speed Ne.

A line L1 represents a maximum torque that can be output from the engine 13. A line L2 represents a line at which the turbocharger 47 starts turbocharging (turbocharging line). In a natural aspiration (NA) range in which the engine torque Te is lower than the turbocharging line L2, the controller 11 fully opens the wastegate valve 55. Thus, the turbocharger 47 does not perform turbocharging because exhaust gas is not introduced into the turbine 53 of the turbocharger 47 but flows through the exhaust gas bypass passage 54. In a turbocharging range in which the torque Te of the engine 13 is higher than the turbocharging line L2, the controller 11 actuates the fully open wastegate valve 55 in a closing direction. Thus, the turbine 53 of the turbocharger 47 is rotated by exhaust energy, and the turbocharger 47 performs turbocharging. By adjusting the opening degree of the wastegate valve 55, the flow rate of the exhaust gas into the turbine 53 of the turbocharger 47 can be adjusted, and the turbocharging pressure of the intake air can be adjusted through the compressor 48.

In the vehicle 10 according to this embodiment, the planetary gear mechanism 20 that functions as the electric continuously variable transmission and the first MG 14 are provided between the engine 13 and each driving wheel 24. Therefore, the vehicle 10 can change the operating point of the engine 13 by controlling the engine 13 and the first MG 14 without changing the rotational speed of each driving wheel 24 (that is, the vehicle speed). The final vehicle driving force can be adjusted by controlling the second MG 15. Therefore, the operating point of the engine 13 can be shifted while adjusting (for example, keeping) the vehicle driving force.

It is assumed that the vehicle 10 is accelerated by shifting, along with an increase in the accelerator operation amount, the engine operating point from a first engine operating point P1 within the NA range to a second engine operating point P2 within the turbocharging range, at which the rotational speed is higher and the torque is greater than those of the first engine operating point P1.

If an attempt is made to increase the engine rotational speed Ne without a decrease in the engine rotational speed Ne, a response delay occurs in the torque generated by the engine 13 in an initial stage of acceleration due to influence of an inertia torque necessary to increase the engine rotational speed Ne and a response delay in the turbocharging pressure of the turbocharger 47. Therefore, there is a possibility that the user (driver) cannot obtain an acceleration feel as intended.

When the vehicle 10 is accelerated by shifting the engine operating point from the first engine operating point P1 to the second engine operating point P2 along with the increase in the accelerator operation amount, the HV-ECU 62 according to this embodiment performs control so that the engine rotational speed Ne is temporarily reduced to a rotational speed lower than the engine rotational speed Ne at the first engine operating point P1 and then increased to the engine rotational speed Ne at the second engine operating point P2. This control is hereinafter referred to also as "turbocharged acceleration control".

In the turbocharged acceleration control, the engine rotational speed Ne is temporarily reduced in the initial stage of acceleration involving actuation of the turbocharger 47. Therefore, the cylinders of the engine 13 are charged with air with higher efficiency, and the pressures in the cylinders increase. Thus, the torque generated by the engine 13 increases. Accordingly, the response delay in the torque generated by the engine 13 is reduced. As a result, the user's acceleration feel in the initial stage of acceleration can be improved as compared to a case where the turbocharged acceleration control is not executed (the engine rotational speed Ne is increased without being temporarily reduced in the initial stage of acceleration).

Figure 5:
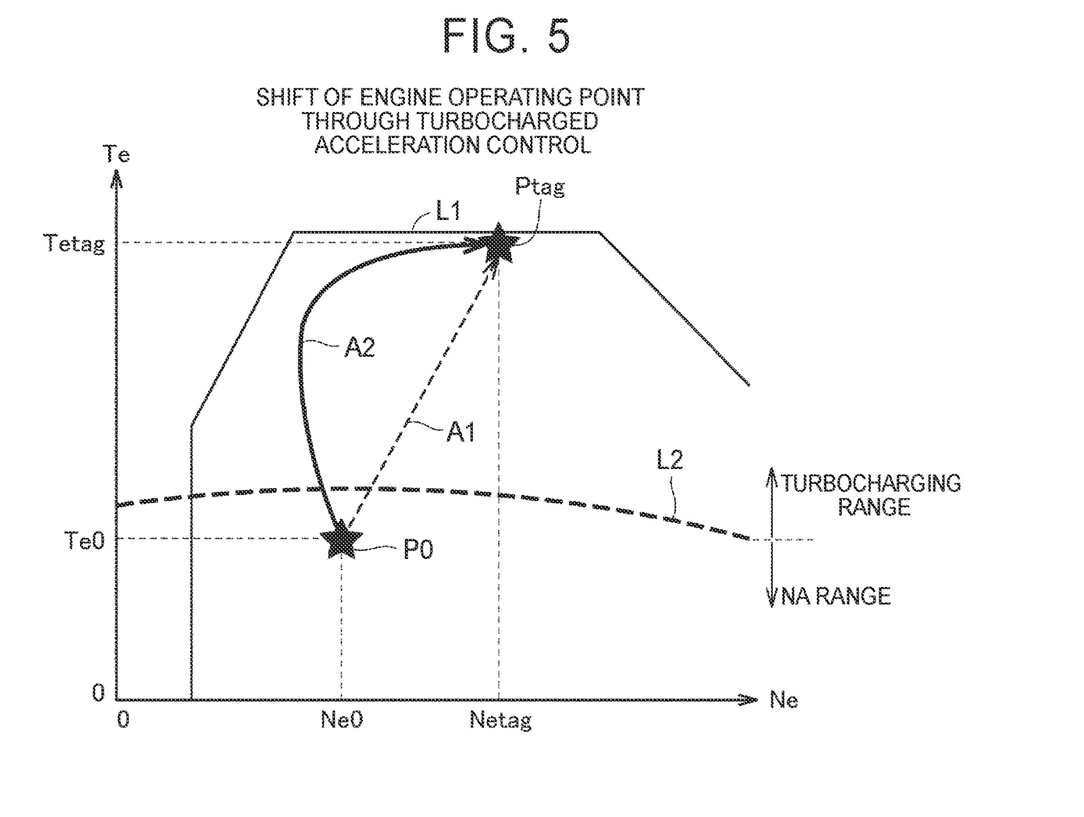
FIG. 5 is a diagram illustrating an example of a shift of the operating point of the engine through turbocharged acceleration control.

FIG. 5 is a diagram illustrating an example of a shift of the operating point of the engine 13 through the turbocharged acceleration control. It is assumed that the engine operating point is shifted from an engine operating point at the start of the turbocharged acceleration control (hereinafter referred to also as "starting operating point P0") to a target engine operating point (hereinafter referred to also as "target operating point Ptag") along with an increase in the accelerator operation amount. The starting operating point P0 falls within the NA range. The target operating point Ptag falls within the turbocharging range in which the rotational speed is higher and the torque is greater than those of the starting operating point P0. In this case, the starting operating point P0 corresponds to the "first engine operating point P1", and the target operating point Ptag corresponds to the "second engine operating point P2".

If an attempt is made to increase the engine rotational speed Ne without a decrease to a rotational speed lower than a starting rotational speed Ne0 as indicated by an arrow A1 in order to shift the engine operating point from the starting operating point P0 to the target operating point Ptag, a response delay may occur in the torque generated by the engine 13 in an initial stage of acceleration due to influence of an inertia torque necessary to increase the engine rotational speed Ne and a response delay in the turbocharging pressure of the turbocharger 47.

In the turbocharged acceleration control according to this embodiment, the engine rotational speed Ne is first temporarily reduced to a rotational speed lower than the starting rotational speed Ne0 and then increased to the target rotational speed Netag as indicated by an arrow A2. For example, the engine rotational speed Ne may start to increase at a timing when a predetermined time elapses from the start of the turbocharged acceleration control. For example, the predetermined time may be a mean time of occurrence of the response delay in the turbocharging pressure (so-called turbo lag) through actual test or simulation.

By temporarily reducing the engine rotational speed Ne in the initial stage of the turbocharged acceleration control, the response delay in the torque generated by the engine 13 is reduced. As a result, the user's acceleration feel in the initial stage of acceleration can be improved.

Figure 6:
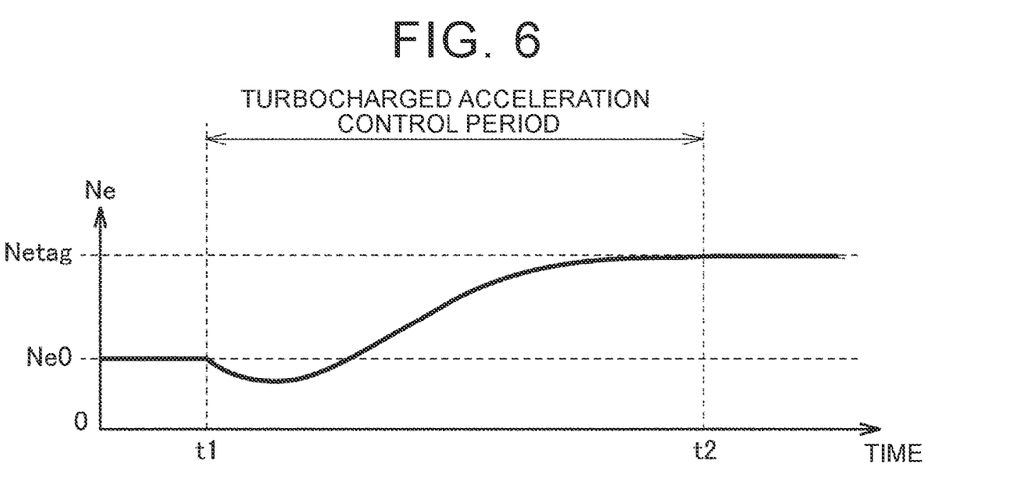
FIG. 6 is a diagram illustrating an example of a shift of an engine rotational speed Ne during a turbocharged acceleration control period.

FIG. 6 is a diagram illustrating an example of a shift of the engine rotational speed Ne during the turbocharged acceleration control period. In FIG. 6, a horizontal axis represents time, and a vertical axis represents the engine rotational speed Ne. FIG. 6 illustrates an example in which the turbocharged acceleration control is started at a time t1 and terminated at a time t2.

As illustrated in FIG. 6, the engine rotational speed Ne is temporarily reduced to a rotational speed lower than the starting rotational speed Ne0 in the initial stage of the turbocharged acceleration control period. Then, the engine rotational speed Ne is increased to the target rotational speed Ntag higher than the starting rotational speed Ne0. That is, the turbocharged acceleration control period from the time t1 to the time t2 corresponds to an example of a "specific period" of the present disclosure.

As described above, the engine rotational speed Ne is temporarily reduced to the rotational speed lower than the starting rotational speed Ne0 and then increased to the target rotational speed Ntag during the turbocharged acceleration control period. If the indicated engine rotational speed Ned (engine rotational speed Ne to be shown by the indicator 36) temporarily decreases along with the decrease in the engine rotational speed Ne, the indicated engine rotational speed Ned decreases even though the user is requesting acceleration by increasing the accelerator operation amount. Therefore, the user may feel discomfort.

During the turbocharged acceleration control period (period in which the engine rotational speed Ne is reduced from the starting rotational speed Ne0 to the rotational speed lower than the starting rotational speed Ne0 and then increased to the target rotational speed Netag higher than the starting rotational speed Ne0), the controller 11 according to this embodiment temporarily keeps the indicated engine rotational speed Ned at the starting rotational speed Ne0 without reducing the indicated engine rotational speed Ned to the rotational speed lower than the starting rotational speed Ne0, and then increases the indicated engine rotational speed Ned to the target rotational speed Netag.

Figure 7:
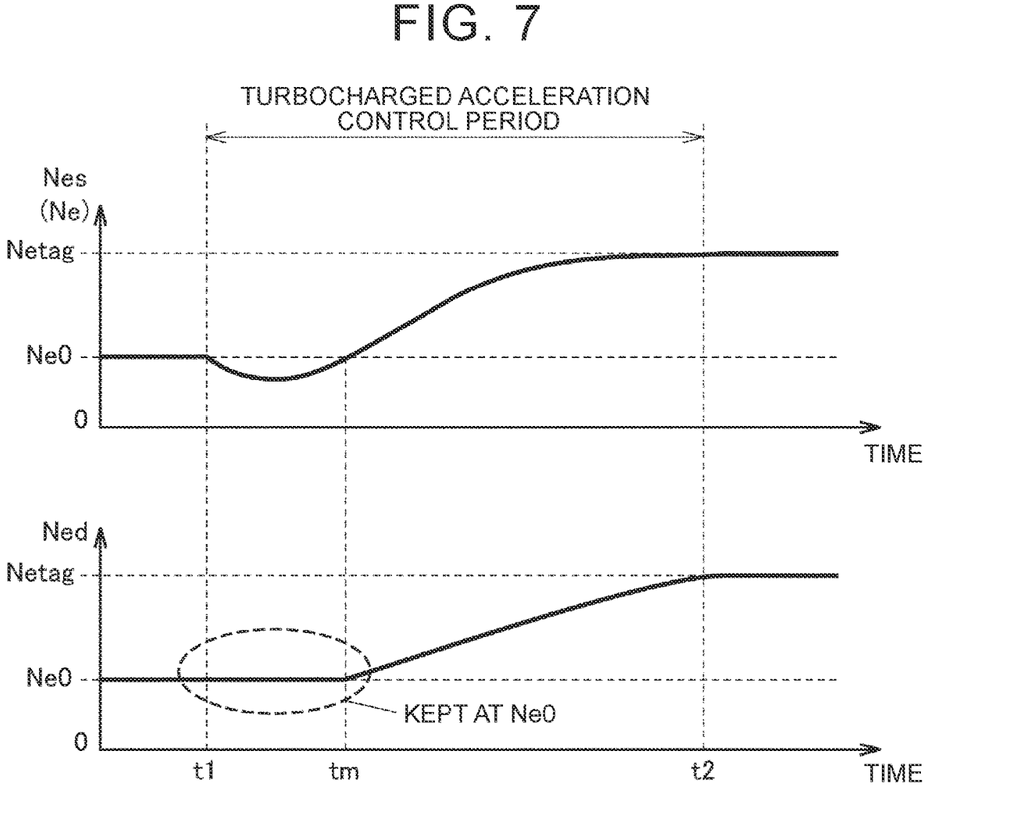
FIG. 7 is a first diagram illustrating an example of shifts of a corrected engine rotational speed Nes and an indicated engine rotational speed Ned during the turbocharged acceleration control period.

FIG. 7 is a diagram illustrating an example of shifts of the corrected engine rotational speed Nes and the indicated engine rotational speed Ned during the turbocharged acceleration control period. In FIG. 7, a horizontal axis represents time, an upper vertical axis represents the corrected engine rotational speed Nes, and a lower vertical axis represents the indicated engine rotational speed Ned.

The corrected engine rotational speed Nes is a value obtained by smoothing the actual engine rotational speed Ne as described above, and follows the actual engine rotational speed Ne. Therefore, the corrected engine rotational speed Nes may hereinafter be replaceable with the actual engine rotational speed Ne.

When the turbocharged acceleration control is started at the time t1 along with an increase in the accelerator operation amount, the engine rotational speed Ne is temporarily reduced below the starting rotational speed Ne0. With this effect, the corrected engine rotational speed Nes temporarily decreases to a rotational speed lower than the starting rotational speed Ne0 in a period from the time t1 to a time tm. In the period from the time t1 to the time tm, the controller 11 keeps the indicated engine rotational speed Ned at the starting rotational speed Ne0 without reducing the indicated engine rotational speed Ned to the rotational speed lower than the starting rotational speed Ne0. Therefore, the decrease in the indicated engine rotational speed Ned is suppressed during the turbocharged acceleration control period in which the user is requesting acceleration. Thus, the difference between the engine rotational speed intended by the user and the indicated engine rotational speed Ned is reduced. As a result, the user's discomfort can be reduced.

After the corrected engine rotational speed Nes reaches the starting rotational speed Ne0 at the time tm, the controller 11 sets the indicated engine rotational speed Ned to the corrected engine rotational speed Nes. Thus, the indicated engine rotational speed Ned can be increased to follow the engine rotational speed Ne.

Figure 8:
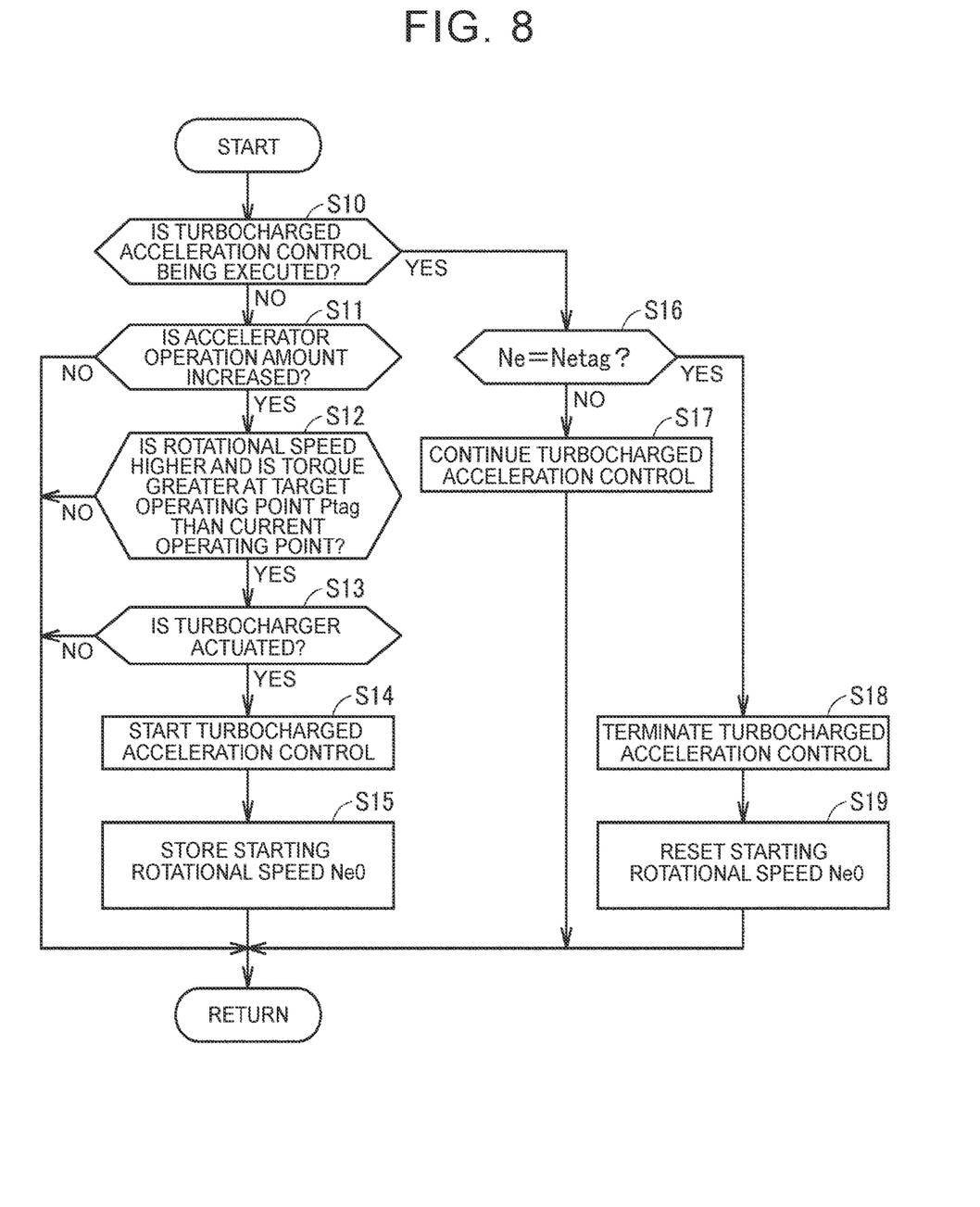
FIG. 8 is a flowchart illustrating an example of a flow of processing to be performed when the controller determines whether to start or terminate the turbocharged acceleration control.

FIG. 8 is a flowchart illustrating an example of a flow of processing to be performed when the controller 11 determines whether to start or terminate the turbocharged acceleration control. The processing in this flowchart is repeated every time a predetermined condition is satisfied (for example, every predetermined period).

First, the controller 11 determines whether the turbocharged acceleration control is being executed (Step S10). When the turbocharged acceleration control is not being executed (NO in Step S10), the controller 11 determines whether the accelerator operation amount is increased (Step S11). When the accelerator operation amount is not increased (NO in Step S11), the controller 11 skips subsequent processing and moves the processing to "RETURN".

When the accelerator operation amount is increased (YES in Step S11), the controller 11 determines whether the rotational speed is higher and the torque is greater at the target operating point Ptag corresponding to the increased accelerator operation amount than the current engine operating point (Step S12). When the rotational speed is not higher and the torque is not greater at the target operating point Ptag than the current engine operating point (NO in Step S12), the controller 11 skips subsequent processing and moves the processing to "RETURN".

When the rotational speed is higher and the torque is greater at the target operating point Ptag than the current engine operating point (YES in Step S12), the controller 11 determines whether the turbocharger 47 is actuated along with the increase in the accelerator operation amount (Step S13). For example, the controller 11 determines that the turbocharger 47 is actuated when the current engine operating point is in the NA range and the target operating point Ptag is in the turbocharging range. The controller 11 may determine that the turbocharger 47 is actuated when the target operating point Ptag is in the turbocharging range irrespective of whether the current engine operating point is in the NA range.

When determination is made that the turbocharger 47 is not actuated (NO in Step S13), the controller 11 skips subsequent processing and moves the processing to "RETURN".

When determination is made that the turbocharger 47 is actuated (YES in Step S13), the controller 11 starts the turbocharged acceleration control (Step S14). Further, the controller 11 stores, in the memory, an engine rotational speed Ne at the start of the turbocharged acceleration control as the starting rotational speed Ne0 (Step S15).

In this embodiment, the turbocharged acceleration control is started under the condition that the accelerator operation amount is increased as one of the conditions. Therefore, the starting rotational speed Ne0 can be regarded as an engine rotational speed Ne at the start of the increase in the accelerator operation amount. In this embodiment, the turbocharged acceleration control is started under the condition that the turbocharger 47 is actuated (that is, the current engine operating point is in the NA range and the target operating point Ptag is in the turbocharging range) as another one of the conditions. Therefore, the starting rotational speed Ne0 can be regarded also as an engine rotational speed Ne at the start of the actuation of the turbocharger 47.

When the turbocharged acceleration control is being executed (YES in Step S10), the controller 11 determines whether the engine rotational speed Ne reaches the target rotational speed Netag (engine rotational speed at the target operating point Ptag) (Step S16).

When the engine rotational speed Ne does not reach the target rotational speed Netag (NO in Step S16), the controller 11 continues the turbocharged acceleration control (Step S17).

When the engine rotational speed Ne reaches the target rotational speed Netag (YES in Step S16), the controller 11 terminates the turbocharged acceleration control (Step S18), and resets the starting rotational speed Ne0 stored in the memory (Step S19).

As described above, the engine rotational speed Ne is reduced from the starting rotational speed Ne0 to a rotational speed lower than the starting rotational speed Ne0 and then increased to the target rotational speed Netag higher than the starting rotational speed Ne0 in a period from start (Step S14) to end (Step S18) of the turbocharged acceleration control.

Figure 9:
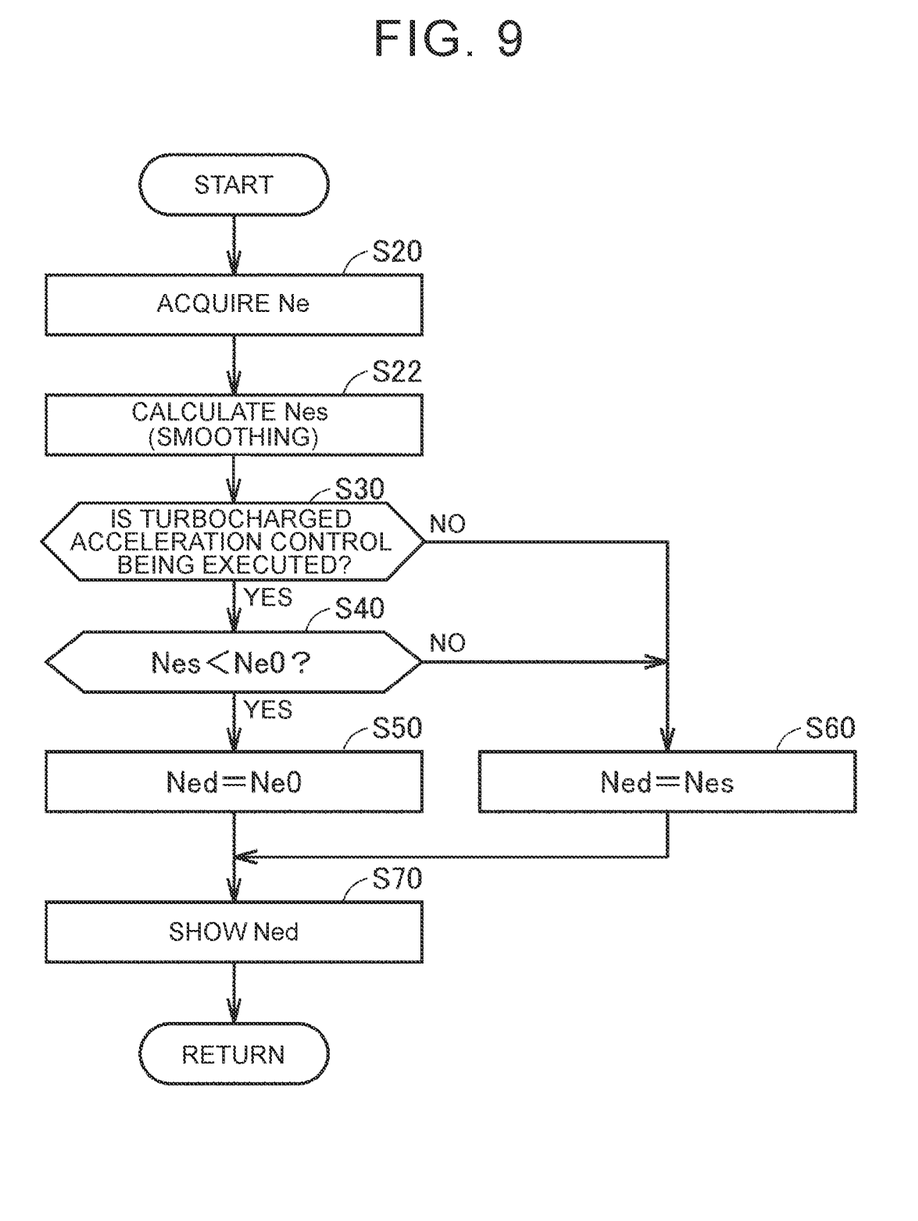
FIG. 9 is a first flowchart illustrating an example of a flow of processing to be performed when the controller controls the indicated engine rotational speed Ned.

FIG. 9 is a flowchart illustrating an example of a flow of processing to be performed when the controller 11 controls the indicated engine rotational speed Ned. The processing in this flowchart is repeated every time a predetermined condition is satisfied (for example, every predetermined period).

The controller 11 acquires the actual engine rotational speed Ne from the engine rotational speed sensor 70 (Step S20).

Subsequently, the controller 11 calculates, as the corrected engine rotational speed Nes, a value obtained by correcting the actual engine rotational speed Ne acquired in Step S20 by smoothing (first-order lag filtering or weighted averaging) (Step S22).

Subsequently, the controller 11 determines whether the turbocharged acceleration control is being executed (Step S30). When the turbocharged acceleration control is not being executed (NO in Step S30), the controller 11 sets the indicated engine rotational speed Ned to the corrected engine rotational speed Nes (Step S60), and causes the indicator 36 to show the indicated engine rotational speed Ned (Step S70).

When the turbocharged acceleration control is being executed (YES in Step S30), the controller 11 determines whether the corrected engine rotational speed Nes is lower than the starting rotational speed Ne0 stored in the memory in Step S15 of FIG. 8 (Step S40).

When the corrected engine rotational speed Nes is lower than the starting rotational speed Ne0 (YES in Step S40), the controller 11 sets the indicated engine rotational speed Ned to the starting rotational speed Ne0 (Step S50), and causes the indicator 36 to show the indicated engine rotational speed Ned (Step S70). Thus, the indicated engine rotational speed Ned is kept at the starting rotational speed Ne0 in the initial period in which the corrected engine rotational speed Nes is lower than the starting rotational speed Ne0 (period from the time t to the time tm in FIG. 7) during the turbocharged acceleration control.

When the corrected engine rotational speed Nes reaches the starting rotational speed Ne0 (NO in Step S40), the controller 11 sets the indicated engine rotational speed Ned to the corrected engine rotational speed Nes (Step S60), and causes the indicator 36 to show the indicated engine rotational speed Ned (Step S70). Thus, in the period in which the corrected engine rotational speed Nes is equal to or higher than the starting rotational speed Ne0 (period from the time tm to the time t2 in FIG. 7) during the turbocharged acceleration control, the indicated engine rotational speed Ned can be increased to the target rotational speed Netag while following the corrected engine rotational speed Nes (actual engine rotational speed Ne).

As described above, during the turbocharged acceleration control period, that is, during the specific period in which the engine rotational speed Ne is reduced from the starting rotational speed Ne0 to the rotational speed lower than the starting rotational speed Ne0 and then increased to the target rotational speed Netag higher than the starting rotational speed Ne0, the controller 11 according to this embodiment temporarily keeps the indicated engine rotational speed Ned at the starting rotational speed Ne0 without reducing the indicated engine rotational speed Ned to the rotational speed lower than the starting rotational speed Ne0. Therefore, the decrease in the indicated engine rotational speed Ned to the rotational speed lower than the starting rotational speed Ne0 is suppressed during the turbocharged acceleration control period in which the user is requesting acceleration. Thus, the difference between the engine rotational speed intended by the user and the indicated engine rotational speed Ned is reduced. As a result, the user's discomfort can be reduced.

During the turbocharged acceleration control period, the controller 11 sets the indicated engine rotational speed Ned to the corrected engine rotational speed Nes after the corrected engine rotational speed Nes reaches the starting rotational speed Ne0 (that is, the indicated engine rotational speed Ned) along with the acceleration of the vehicle 10. Thus, the indicated engine rotational speed Ned can be increased to the target rotational speed Netag while following the engine rotational speed Ne.

In the embodiment described above, description is given of the example in which the indicated engine rotational speed Ned is kept at the starting rotational speed Ne0 in the initial period of the turbocharged acceleration control.

In a modified example, the indicated engine rotational speed Ned is gently increased from the starting rotational speed Ne0 at a predetermined increase rate in the initial period of the turbocharged acceleration control.

Figure 10:
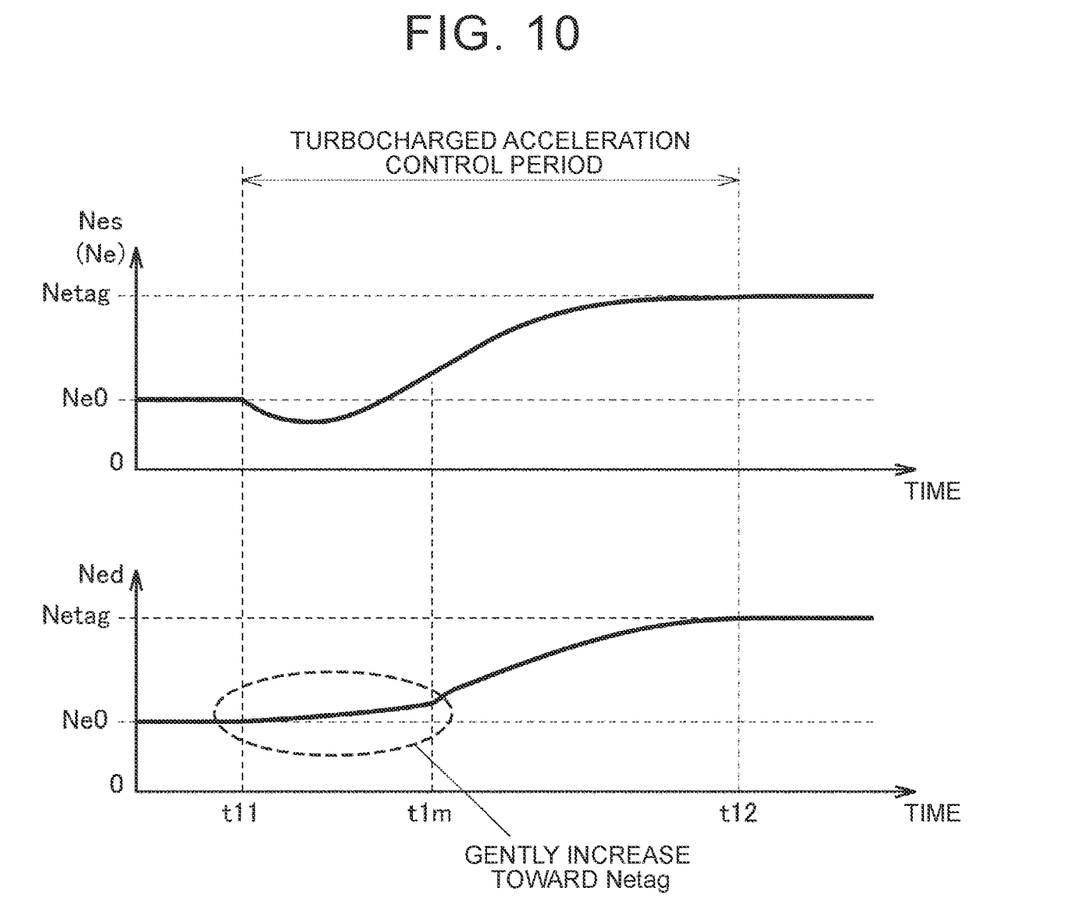
FIG. 10 is a second diagram illustrating an example of the shifts of the corrected engine rotational speed Nes and the indicated engine rotational speed Ned during the turbocharged acceleration control period.

FIG. 10 is a diagram illustrating an example of the shifts of the corrected engine rotational speed Nes and the indicated engine rotational speed Ned during the turbocharged acceleration control period according to this modified example. In FIG. 10, a horizontal axis represents time, an upper vertical axis represents the corrected engine rotational speed Nes, and a lower vertical axis represents the indicated engine rotational speed Ned.

When the turbocharged acceleration control is started at a time t11 along with an increase in the accelerator operation amount, the engine rotational speed Ne is temporarily reduced below the starting rotational speed Ne0. With this effect, the corrected engine rotational speed Nes temporarily decreases to a rotational speed lower than the starting rotational speed Ne0. When the turbocharged acceleration control is started at the time t11, the controller 11 according to this modified example gently increases the indicated engine rotational speed Ned from the starting rotational speed Ne0 toward the target rotational speed Netag at the predetermined increase rate. Therefore, the decrease in the indicated engine rotational speed Ned to the rotational speed lower than the starting rotational speed Ne0 is suppressed during the turbocharged acceleration control period in which the user is requesting acceleration. Thus, the user's discomfort can be reduced.

After the indicated engine rotational speed Ned reaches the corrected engine rotational speed Nes at a time t1m, the controller 11 sets the indicated engine rotational speed Ned to the corrected engine rotational speed Nes. Thus, the indicated engine rotational speed Ned can be increased to the target rotational speed Netag while following the corrected engine rotational speed Nes (actual engine rotational speed Ne).

Figure 11:
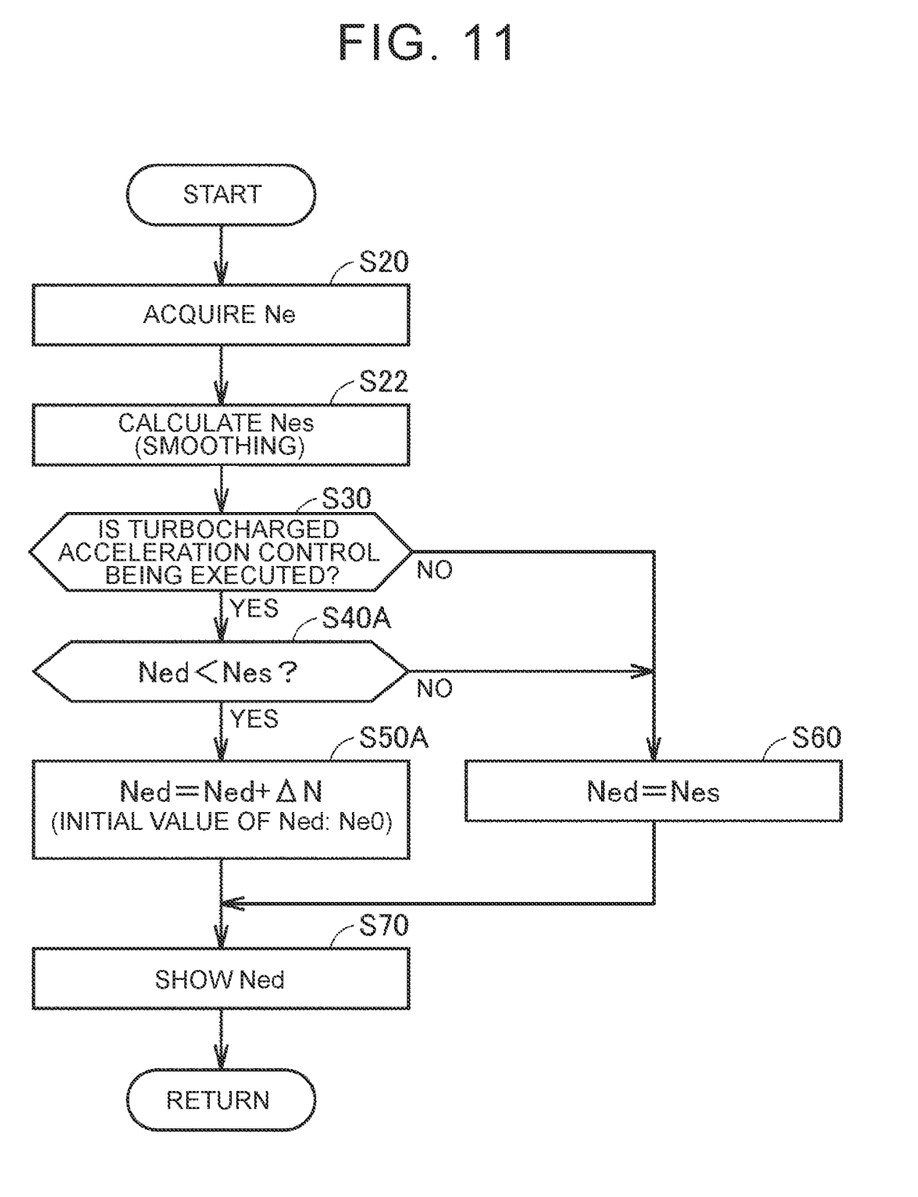
FIG. 11 is a second flowchart illustrating an example of the flow of the processing to be performed when the controller controls the indicated engine rotational speed Ned.

FIG. 11 is a flowchart illustrating an example of the flow of the processing to be performed when the controller 11 controls the indicated engine rotational speed Ned according to this modified example. The processing in this flowchart is repeated every time a predetermined condition is satisfied (for example, every predetermined period).

The flowchart of FIG. 11 is a modification of the flowchart of FIG. 9 in that Steps S40 and S50 are replaced with Steps S40A and S50A, respectively. The other steps (steps having the same numbers as those of the steps illustrated in FIG. 9) are already described, and therefore detailed description is not repeated.

When the turbocharged acceleration control is being executed (YES in Step S30), the controller 11 determines whether the indicated engine rotational speed Ned is lower than the corrected engine rotational speed Nes (Step S40A).

When the indicated engine rotational speed Ned is lower than the corrected engine rotational speed Nes (YES in Step S40A), the controller 11 gently increases the indicated engine rotational speed Ned at the predetermined increase rate (Step S50A). Specifically, the controller 11 calculates, as a current value of the indicated engine rotational speed Ned, a value obtained by adding a predetermined small value $\Delta N$ to a previous value of the indicated engine rotational speed Ned. An initial value of the indicated engine rotational speed Ned is the starting rotational speed Ne0. Therefore, the decrease in the indicated engine rotational speed Ned to the rotational speed lower than the starting rotational speed Ne0 is suppressed during the turbocharged acceleration control period in which the user is requesting acceleration. Thus, the user's discomfort can be reduced.

When the indicated engine rotational speed Ned reaches the corrected engine rotational speed Nes (NO in Step S40A), the controller 11 sets the indicated engine rotational speed Ned to the corrected engine rotational speed Nes (Step S60). Thus, the indicated engine rotational speed Ned can be increased to the target rotational speed Netag while following the corrected engine rotational speed Nes (actual engine rotational speed Ne).

In this modification, similarly to the embodiment described above, the decrease in the indicated engine rotational speed Ned to the rotational speed lower than the starting rotational speed Ne0 is suppressed during the turbocharged acceleration control period in which the user is requesting acceleration. Thus, the user's discomfort can be reduced.

In the embodiment described above, description is given of the example in which the vehicle 10 includes the planetary gear mechanism 20 that functions as the electric continuously variable transmission and the first MG 14 between the engine 13 and each driving wheel 24. The continuously variable transmission provided in the vehicle 10 is not limited to the electric continuously variable transmission, but may be a mechanical continuously variable transmission using a metal belt or the like.

In the embodiment described above, description is given of the case where the vehicle 10 is the hybrid vehicle. The vehicle to which the control of the present disclosure is applicable is not limited to the hybrid vehicle. For example, the control of the present disclosure is also applicable to a conventional vehicle including a continuously variable transmission between an engine and each driving wheel.

In the embodiment described above, description is given of the example in which the engine 13 includes the turbocharger 47. The control of the present disclosure is also applicable to an engine with no turbocharger.

It should be understood that the embodiment disclosed herein is illustrative but is not limitative in all respects. The scope of the present disclosure is defined by the claims rather than the above description, and is intended to encompass meanings of equivalents to the elements in the claims and all modifications within the scope of the claims.

What is claimed is:

1. An indicator control system comprising:
   an indicator configured to show a rotational speed of an internal combustion engine; and
   a controller configured to control an indicated rotational speed, which is the rotational speed to be shown by the indicator, wherein
   the controller is configured such that, during a specific period in which the rotational speed of the internal combustion engine is reduced from a first rotational speed to a rotational speed lower than the first rotational speed and then increased to a second rotational speed higher than the first rotational speed, the controller increases the indicated rotational speed to the second rotational speed without reducing the indicated rotational speed from the first rotational speed to the rotational speed lower than the first rotational speed.

2. The indicator control system according to claim 1, wherein the controller is configured to keep the indicated rotational speed at the first rotational speed and then increase the indicated rotational speed to the second rotational speed in the specific period.

3. The indicator control system according to claim 1, wherein the controller is configured to increase the indicated rotational speed from the first rotational speed at a predetermined increase rate in the specific period.

4. A vehicle comprising:
an indicator configured to show a rotational speed of an internal combustion engine;
a driving wheel;
a continuously variable transmission provided between the internal combustion engine and the driving wheel; and
a controller configured to control an indicated rotational speed, which is the rotational speed to be shown by the indicator, wherein
the controller is configured such that, during a specific period in which the rotational speed of the internal combustion engine is reduced from a first rotational speed to a rotational speed lower than the first rotational speed and then increased to a second rotational speed higher than the first rotational speed, the controller increases the indicated rotational speed to the second rotational speed without reducing the indicated rotational speed from the first rotational speed to the rotational speed lower than the first rotational speed.

5. The vehicle according to claim 4, further comprising a rotating electrical machine, wherein the continuously variable transmission is a planetary gear mechanism provided between the internal combustion engine, the rotating electrical machine, and the driving wheel.

6. The vehicle according to claim 4, wherein the internal combustion engine includes a turbocharger.

7. The vehicle according to claim 6, wherein
the specific period is started when the turbocharger is actuated,
the first rotational speed is a rotational speed of the internal combustion engine at a start of the actuation of the turbocharger, and
the controller is configured such that, when the rotational speed of the internal combustion engine is lower than the first rotational speed in the specific period, the controller sets the indicated rotational speed equal to or higher than the first rotational speed.

8. The vehicle according to claim 4, wherein
the specific period is started when an accelerator operation amount is increased,
the first rotational speed is a rotational speed of the internal combustion engine at a start of the increase in the accelerator operation amount, and
the controller is configured such that, when the rotational speed of the internal combustion engine is lower than the first rotational speed in the specific period, the controller sets the indicated rotational speed equal to or higher than the first rotational speed.

9. The vehicle according to claim 4, wherein the controller is configured such that, after the rotational speed of the internal combustion engine reaches the indicated rotational speed along with acceleration of the vehicle in the specific period, the controller sets the indicated rotational speed to the rotational speed of the internal combustion engine.

* * * * *